# 2,757,160

STABLE NON-TACKY GRANULAR FILLED UNSATURATED ALKYD MOLDING COMPOUND COMPRISING A LIQUID MONOMER AND A COMPATIBLE POLYMER

Thomas F. Anderson, Wilmington, Del., assignor, by mesne assignments, to Allied Chemical & Dye Corporation, New York, N. Y., a corporation of New York No Drawing. Application March 4, 1953,
Serial No. 340,395

8 Claims. (Cl. 260—40)

The invention relates to a stable granular unsaturated alkyd molding composition that gives molded articles having improved water resistance and electrical properties.

A rapidly growing demand exists for polymerizable unsaturated alkyd molding compositions. For most purposes, it is necessary that such molding compositions be in granular form, so that the principal demand is for granular molding compositions.

The stability of the polymerizable unsaturated alkyd molding compositions that are in commercial use is dependent upon the presence of air permeating the compositions. If such a molding composition forms a solid lump or cake so that air does not permeate the composition, the interior of the lump or cake rapidly polymerizes to form a hard, infusible core, and the presence of such an infusible core makes the material worthless as a molding composition. Moreover, the presence of lumps containing infusible cores, resembling hard stones, may cause serious damage to expensive molds if an attempt is made to use the material as a molding composition.

In order to produce granular unsaturated alkyd molding compositions that do not form solid lumps or cakes during storage, crystalline polymerizable unsaturated alkyds have been used. However, the use of a crystalline alkyd is a severe handicap, because a crystalline alkyd gives a molding composition that does not flow satisfactorily during a molding operation, so that the resulting molded articles have voids or excessive porosity, resulting in surface defects and unsatisfactory strength. Moreover, in order to produce a crystalline alkyd, it is necessary to sacrifice other desirable properties of the alkyd, and the necessity of obtaining the alkyd in crystalline form entails considerable expense and inconvenience in the process steps that are used in preparing the molding composition, because the alkyd often crystallizes very slowly and sometimes fails to crystallize. For these reasons, it has been found to be highly advantageous to use a liquid rather than a crystalline alkyd in the production of a granular polymerizable unsaturated alkyd molding composition.

It is well known that the water resistance and electrical properties of articles produced from a polymerizable unsaturated alkyd molding composition are greatly improved by the presence in the molding composition of a liquid substance having at least one polymerizably reactive $CH_2=C<$ group per molecule and having a boiling point not less than 80 degrees C. Thus, all the polymerizable alkyd molding compositions that are in commercial use contain such a substance, and a polymerizable unsaturated alkyd molding composition containing no such substance would not be acceptable for ordinary commercial use.

The quality of the molded articles produced from a granular molding composition containing a liquid polymerizable unsaturated alkyd and a filler has been limited by the fact that it has not been possible heretofore to use in such a molding composition an amount of a liquid substance having at least one polymerizably reactive $CH_2=C<$ group per moleclue and having a boiling point not less than 80 degrees C. that is more than about ten per cent of the combined weight of the unsaturated alkyd and such substance, without rendering the composition tacky so as to be commercially unacceptable because of the formation of lumps as hereinbefore described.

The principal object of the present invention is to provide a non-tacky granular molding composition, comprising a filler, a polymerizable non-crystalline unsaturated alkyd, and a liquid substance having at least one polymerizably reactive $CH_2=C<$ group per molecule and having a boiling point of at least 80 degrees C., in which the weight of said substance is more than ten per cent of the combined weight of the unsaturated alkyd and said substance. More specific objects and advantages are apparent from the description, which illustrates and discloses but is not intended to limit the scope of the invention.

A non-tacky granular molding composition embodying the invention comprises, as a binder, a solution of (a) nine parts of an amorphous polymerizable unsaturated alkyd whose molecule contains a plurality of polymerizably reactive $\Delta^{2,3}$-enedioyl groups, (b) between 1.0 and 5.0 parts of a liquid monomeric substance having at least one polymerizably reactive $CH_2=C<$ group per molecule and having a boiling point of at least 80° C., and (c) between 0.1 and 5.0 parts of a polymer of a substance having at least one polymerizably reactive $CH_2=C<$ group per molecule, (c) being compatible with the copolymer of (a) and (b).

The present invention is based upon the discovery that it is possible to prepare a non-tacky granular molding composition, comprising a filler, a polymerizable non-crystalline unsaturated alkyd, and a liquid substance having at least one polymerizably reactive $CH_2=C<$ group per molecule and having a boiling point of at least 80 degrees C., in which the weight of said substance is more than ten per cent of the combined weight of the unsaturated alkyd and said substance, by incorporating in the composition a polymer of a liquid substance having at least one polymerizably reactive $CH_2=C<$ group per molecule, and that the molding composition so prepared gives molded articles having improved water resistance and electrical properties.

That it is the polymer of a liquid substance having at least one polymerizably reactive $CH_2=C<$ group per molecule which causes a composition of the invention to be a non-tacky granular composition even though it comprises more than ten per cent by weight of an unsaturated liquid monomer has been demonstrated as follows:

A composition of the invention was prepared by the following procedure:

A polymerizable unsaturated alkyd (968 grams, prepared by esterifying 1 mol of propylene glycol with 0.2 mol of phthalic anhydride and 0.8 mol of maleic anhydride in the presence of an amount of hydroquinone equal to 0.06 per cent of the charge) and a solution consisting of a polymer (126 grams of polystyrene) dissolved in an unsaturated liquid monomer (379 grams of styrene) were mixed in a Banbury mixer with 59.6 grams of "Luperco ATC" catalyst (a paste consisting of 50 per cent benzoyl peroxide and 50 per cent tricresyl phosphate), anthophyllite fibers (1000 grams), kaolin (1950 grams), zinc oxide (500 grams) and a lubricant (100 grams of zinc stearate). The mixing was continued until a homogeneous dough was obtained. The material was then passed through warm rubber rolls to form sheets of a thickness of approximately ⅛ inch. The sheets were allowed to solidify fully while at a temperature between 80 and 90 degrees F. and were then readily granulated in a high speed cutter to a maximum particle diameter of about ⅛ inch. The resulting material retained its non-tacky free-flowing granular form upon storage and no coalescing of the granules was observed.

For the sake of comparison, a control composition was prepared by the procedure described in the preceding paragraph except that no polystyrene was used, and the proportions of the other ingredients were as follows: 1250 grams of the unsaturated alkyd, 673 grams of styrene, 77 grams of the catalyst, 1380 grams of anthophyllite, 2830 grams of kaolin, 690 grams of zinc oxide and 138 grams of zinc stearate. The sheeted product was putty-like and could be cut into granules only with great difficulty. The granules were so tacky and gummy that they soon coalesced and fused into a solid mass.

The control composition had a considerably higher filler-to-resin ratio than the composition of the invention, which ordinarily would result in less tackiness. Yet the control composition was tacky and sticky, while the composition of the invention was non-tacky and was granulated with ease. Thus, it is apparent that the reason why a granular molding composition of the invention is non-tacky and retains its free-flowing granular form under storage conditions despite the fact that it contains more than 10 per cent of liquid monomer is that a polymer of a substance having at least one polymerizably reactive $CH_2=C<$ group per molecule is used in the preparation of such a composition. When such a polymer is not used in the preparation of an unsaturated alkyd molding composition, the non-tacky granular form can be retained only by a drastic reduction in the liquid monomer content.

POLYMERIZABLE UNSATURATED ALKYD

The term "amorphous," as applied to a polymerizable unsaturated alkyd used in the practice of the invention, is employed herein to distinguish such an alkyd from a crystalline polymerizable unsaturated alkyd. A crystalline unsaturated alkyd (which has been employed heretofore when a non-tacky granular molding composition having a high content of liquid unsaturated monomer was desired) has many disadvantages, as hereinbefore pointed out. The amorphous alkyds employed in the practice of the invention, on the other hand, do not offer such disadvantages.

A composition of the invention comprises an amorphous polymerizable unsaturated alkyd whose molecule contains a plurality of polymerizably reactive $\Delta^{2,3}$-enedioyl groups. Such an unsaturated alkyd is a polyester prepared by reaction of one or more polyhydric alcohols with one or more polycarboxylic acids having in the molecule at least one polymerizably reactive $\Delta^{2,3}$-enoyl group, having the structure

Thus, the polymerizable alkyd is one having polymerizably reactive $\Delta^{2,3}$-enoyl groups contained in dioyl radicals (connecting polyhydric alcohol residues through ester linkage), which dioyl radicals may therefore be defined as $\Delta^{2,3}$-enedioyl radicals (e. g., butenedioyl radicals such as maleyl or fumaryl radicals). The proportion of polyhydric alcohols having more than two hydroxy groups, such as glycerol or pentaerythritol, and the proportion of polycarboxylic acids having more than two carboxy groups, such as citric acid, preferably is small so that in the production of the alkyd there may be maximum esterification of the hydroxy and carboxy groups without attainment of excessive viscosity (i. e., through cross-linking). For the purpose of the instant invention it is to be understood that the term "unsaturated alkyd" means an alkyd that is polymerizable into an infusible or high melting point resin; so the proportion of unsaturated components should be such that the alkyd contains an average of at least three double bonds per molecule.

The present invention is applicable to all amorphous polymerizable unsaturated alkyds. Preferably the alkyd is an ester of a glycol with a dicarboxy alkene having from four to five carbon atoms, in which the carboxy radicals are attached to adjacent carbon atoms (i. e., maleic, fumaric, itaconic, citraconic or mesaconic acid). However, as long as the $\Delta^{2,3}$-enoyl groups are polymerizably reactive, the polycarboxylic acid is not necessarily a hydrocarbon dicarboxylic acid but may contain any radicals (e. g., chloro groups) which do not render the $\Delta^{2,3}$-enoyl groups polymerizably non-reactive. The alkyd may be an ester of a polycarboxylic acid with any glycol, such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Also, the polyhydric alcohol used may be one whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,3,4, a trihydroxy normal alkane having from four to five carbon atoms such as butantriol-1,2,3, or a monoalkyl ether of pentaerythritol or butantetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid.

In the practice of the invention the preferred polymerizable unsaturated alkyds are the so-called "linear" alkyds, i. e., those which have very little cross-linking in the alkyd molecules, as evidenced by the fact that such alkyds are soluble in solvents such as acetone. Such alkyds are formed mainly by esterification of a dihydric alcohol and a dibasic acid. Of course, such alkyds are really only "substantially" linear since it is not possible to avoid all cross-linking, at least through the unsaturated bonds in the akyd molecules. In fact, a linear (or substantially linear) alkyd may be obtained even though in the preparation of such alkyd a small proportion of the dihydric alcohol (e. g., less than about 5 mol per cent of the alcohol) is replaced by a polyhydric alcohol containing more than two alcohol radicals, such as glyercol or pentaerythritol, or a small proportion of the dibasic acid (e. g., less than about 5 mol per cent of the acid) is replaced by a polybasic acid containing more than two acid radicals, such as citric acid. The preferred linear alkyd for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the alkyd during the esterification reaction.

The molecular weight of polymerizable unsaturated alkyds for use in the practice of the invention may vary over a wide range, depending upon the initial reaction ingredients and upon the degree of reaction obtained in the preparation of the alkyds. An alkyd used in the practice of the invention may have a molecular weight ranging from as low as about 500 to as high as about 5000, but ordinarily the molecular weights of preferred polymerizable unsaturated alkyds used in the present invention are in the lower portion of the range; for example, the molecular weight of an alkyd prepared from ethylene glycol, maleic anhydride and small amounts of propylene glycol and phthalic anhydride usually is within the range from about 700 to about 2000.

The number of repeating units in a polymerizable unsaturated alkyd chain, i. e., the number of acid and alcohol residues in the chain-like molecules of the alkyd may also vary, and alkyds having a high molecular weight have correspondingly long chain molecules. In general, in a polymerizable alkyd used in the practice of the invention the number of repeating units in the alkyd chains may range from about 3 to about 25. However, in preferred alkyds used in the present invention there are usually from about 4 to about 15 units in the alkyd chains. Assuming that there is substantially no cross-linking in such polymerizable unsaturated alkyds and that equivalent quantities of, for example, glycol and maleic acid are employed, the number of olefinic unsaturations attached to carbon atoms in the chains of such polymerizable alkyds is, of course, merely the number of acid residues in the alkyd chain. However, if part of the maleic acid is replaced by a saturated acid in the preparation of a polymerizable alkyd, the number of olefinic unsaturations is lower in proportion to the amount of saturated acid employed, even though the number of acid and alcohol units in the chain remains about the same. Other properties of the unsaturated alkyd, such as solubility in various solvents, also may be varied by selecting various reacting ingredients and varying their proportions. The infusibility, hardness and inertness of the product obtained by polymerization of the alkyd may be increased by varying the initial reacting ingredients to increase the average number of olefinic double bonds per molecule of the polymerizable alkyd.

In the preparation of the polymerizable unsaturated alkyd, any of the usual modifiers such as monobasic acids, monohydric alcohols and natural resin acids may be added. The larger the proportions of monobasic acids and monohydric alcohols, the lower is the average number of acid and alcohol residues in the resulting alkyd molecules, and the lower is the viscosity of the alkyd. On the other hand, the more nearly equal the molecular proportions of the dibasic acid and dihydric alcohol, the greater is the average number of residues in the resulting alkyd molecules, and the greater is the viscosity. The proportions of ingredients used are those proportions that produce a polymerizable alkyd of the desired viscosity. In the practice of the invention it is desirable that the proportion of monobaisc acids and monohydric alcohols be kept low enough to allow substantial growth of the chain-like molecules during preparation of the unsaturated alkyd, since the presence of a substantial proportion of such monobasic acids and monohydric alcohols retards the chain growth of the alkyds and produces alkyds which may not harden satisfactorily.

The effect of the addition of a small proportion of a monohydric alcohol or a monobasic acid upon the chain growth of an alkyd is dependent to a great extent upon the degree of reaction attained before such a monofunctional acid or alcohol is added. For example, if added at the beginning of the reaction of a dibasic acid with a dihydric alcohol, each molecule of the monofunctional ingredient which reacts with a difunctional acid or alcohol stops the growth of that alkyd chain in one direction so that long chain molecules of the alkyd are difficult to obtain under such conditions. However, if added when the reaction of dibasic acid and dihydric alcohol is almost complete so that fairly long chains have already been built up, the monofunctional ingredient merely esterifies those end groups present in the existing alkyd chains and, therefore, only a small amount may be incorporated in the alkyd without having any deleterious effect upon the final product.

In the production of polymerizable unsaturated alkyd compositions in the practice of the invention, the proportion of monohydric alcohol or monobasic acid used is never above about 10 mol per cent of the acid or alcohol content. Ordinarily the proportion of monohydric alcohol or monobasic acid that may be incorporated in polymerizable unsaturated alkyds for use in molding compositions of the invention is not more than about 5 mol per cent of the alcohol or acid content, although alkyds used in casting compositions occasionally may contain a slightly higher proportion of monofunctional ingredients. However, polymerizable unsaturated alkyds for use in the practice of the invention usually contain not more than about 2 mol per cent of monofunctional acid or alcohol in order that such alkyds may be readily polymerized into infusible or high melting point resins.

The point to which the reaction of the ingredients is carried in the preparation of the polymerizable alkyd is simply that point at which the product has the desired consistency. The consistency or viscosity of the alkyd (prepared by reaction under conditions which prevent any appreciable addition polymerization) varies directly with the average number of acid and alcohol residues in the molecule.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the alkyd, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated alkyd preferably is carried out in an atmosphere of an inert gas such as carbon dioxide, nitrogen or the like, in order to prevent cross-linking through addition polymerization as well as to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because oxygen causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable alkyd may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, an alkyd is obtained in the form of a stiff liquid having an acid number of 18.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting alkyd is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable alkyd may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients; and the reaction is carried out for four hours at 200° C. to produce a stiff liquid having an acid number of 10.6.

A polymerizable alkyd may also be prepared by a procedure that is the same as in the preceding paragraph except that the maleic anhydride is replaced by 5 mols of fumaric acid; the amount of diethylene glycol is 5 mols; and the reaction is continued for 8¼ hours at 220° C. The resulting alkyd is a stiff liquid having an acid number of 23.

As a further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable alkyd may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable alkyd may be prepared by a procedure that is the same as the next to the last pargaraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a stiff liquid which has an acid number of 10.1.

POLYMERIZABLE UNSATURATED LIQUID SUBSTANCE

A composition of the invention comprises a monomeric liquid substance (or mixture of such substances) having at least one polymerizably reactive $CH_2=C<$ group per molecule and having a boiling point of at least 80 degrees C. It is preferable that such substance have a plurality of polymerizably reactive $CH_2=C<$ groups per molecule, the preferred $CH_2=C<$ groups being allyl groups. Also such substance should be copolymerizable with the unsaturated alkyd used. The polymerizably reactive $CH_2=C<$ group or plurality of such groups may be contained in radicals of unsaturated acids such as itaconic acid, or in other unsaturated radicals such as vinyl or allyl radicals. These unsaturated radicals may be connected directly to carbon atoms in the molecule, or may be connected to the rest of the molecule by ester, ether or amide linkages.

A polymerizable unsaturated liquid monomeric substance whose molecule contains only one polymerizably reactive $CH_2=C<$ group may be a vinyl compound such as styrene, or p-methyl styrene, 2,4-dimethyl styrene, 2,3-dimethyl styrene, 2,5-dimethyl styrene, isopropenyl toluene, vinyl naphthalene, vinyl benzoate, vinyl dibenzofuran or acrylonitrile; or an alkyl ester or the amide of a monobasic acid whose molecule contains a $CH_2=C<$ group or the aldehyde corresponding to such an acid, such as methyl acrylate, methyl methacrylate, isobutyl methacrylate, methacrolein, acrolein, acrylamide or methacrylamide; or an ester of a monohydric alcohol whose molecule contains one $CH_2=C<$ group with a saturated monobasic acid, e. g., allyl lacetate.

A polymerizable unsaturated monomeric substance whose molecule contains two or more polymerizably reactive $CH_2=C<$ groups which may be used in the practice of the invention may be an ester of a monohydric alcohol whose molecule contains one $CH_2=C<$ group with a monobasic acid whose molecule contains one $CH_2=C<$ group (e. g., allyl acrylate or allyl methacrylate); or an ester or mixed ester of a molecule of a saturated dihydric alcohol with two molecules of a monobasic acid whose molecule contains a $CH_2=C<$ group (e. g., ethylene dimethacrylate, triethylene dimethacrylate, propylene dimethacrylate, hexamethylene dimethacrylate); or an ester or mixed ester of two alcohol molecules, each consisting of a molecule of allyl, methallyl or B-chloroallyl alcohol, with a molecule of any of the dibasic acids listed in Table I as follows:

*Table I*

Maleic acid

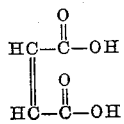

| | |
|---|---|
| Chloromaleic acid | 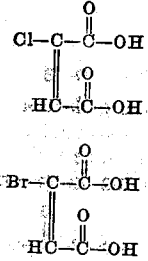 |
| Bromomaleic acid | 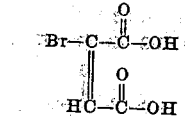 |
| Fumaric acid |  |
| Chlorofumaric acid | 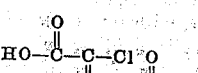 |
| Bromofumaric acid | 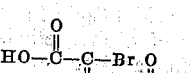 |
| Mesaconic acid | 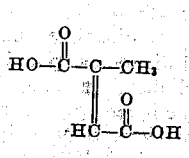 |
| Citraconic acid | 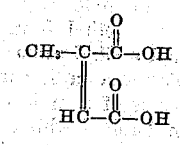 |
| Itaconic acid | 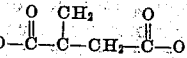 |
| Carbonic acid | 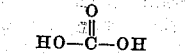 |
| Oxalic acid | 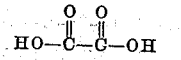 |
| Malonic acid | 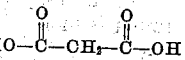 |
| Succinic acid | 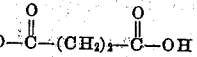 |
| Glutaric acid | 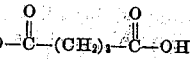 |
| Adipic acid | 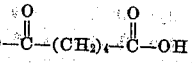 |
| Pimelic acid | 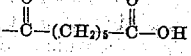 |
| Suberic acid | 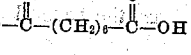 |
| Azelaic acid | 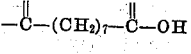 |
| Sebacic acid | 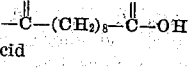 |
| Benzene dicarboxylic acid | 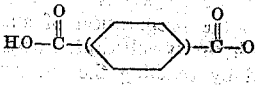 |
| Biphenyldicarboxylic acid | 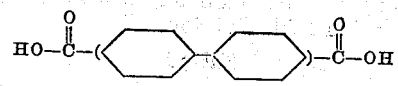 |
| Naphthalene dicarboxylic acid | 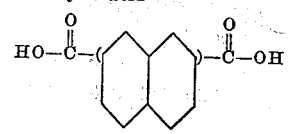 |
| Cyclohexane dicarboxylic acid | 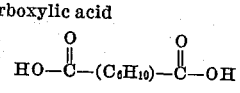 |
| Pyrotartaric acid | 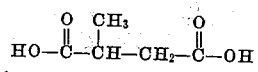 |
| Phenyl phosphonic acid | 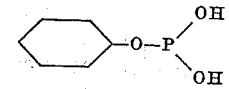 |

"Benzene dicarboxylic acid" in the foregoing table includes o-, m-, and p-phthalic acid. Similarly, the enclosure of the biphenyl ring and the naphthalene ring in parentheses in the above table is intended to indicate that any of the various position isomers may be used. In the case of cyclohexane dicarboxylic acids, any of the various position isomers may be used either in cis or in trans relationship.

The polymerizable unsaturated monomeric substance may also be an ester of a molecule of one fo the dibasic acids listed in Table I with one molecule of a saturated monohydric alcohol such as methyl, ethyl, n-propyl, isopropyl, n-butyl, isobutyl, secondary butyl or tertiary butyl alcohol or cello-solve and one molecule of one of the unsaturated monohydric alcohols hereinbefore described.

The polymerizable monomeric compound may also be an ester or mixed ester of a molecule of a tribasic or other polybasic organic or inorganic acid with three or more monohydric alcohol molecules each having a $CH_2=C<$ group. Such monomeric compounds include triallyl tricarballylate, triallyl aconitate, triallyl citrate, triallyl phosphate, trimethallyl phosphate, triallyl cyanurate, and tetrallyl silicate.

The polymerizable monomeric compound may also consist of an ester of two substances that will be described, one of which has a carboxy group and the other of which has an alcoholic hydroxy group. The substance having a carboxy group may have the general formula F—OH in which F is the acid radical of acrylic or methacrylic acid, or may have the general formula R—O—D—OH, in which R is allyl, methallyl, or beta-chloro allyl and D is the divalent acid radical of any of the dibasic acids listed in Table I. When D is the divalent acid radical of itaconic acid, R may be methyl, ethyl, n-propyl, isopropyl, n-butyl, isobutyl, secondary butyl or tertiary butyl.

The substance having an alcoholic hydroxy group may consist of a compound having the general formula

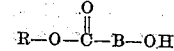

in which R is the monovalent hydrocarbon radical or monovalent chlorinated hydrocarbon radical of any of the alcohols listed in Table II, below, and in which B is methylene, methyl methylene, or any phenylene radical. The substance having an alcoholic hydroxy group may also consist of a compound having the general formula R—O—D—O—E—OH in which D is the divalent acid radical of any of the dibasic acids listed in Table I, R has the same significance as in the preceding general formula and E is the divalent radical to which two hydroxy groups are attached in any of the dihydroxy compounds listed in Table III below.

Table II

Allyl alcohol
$$CH_2=CH-CH_2-OH$$

Alpha-methyl allyl alcohol
$$CH_2=CH-\underset{\underset{CH_3}{|}}{CH}-OH$$

Methallyl alcohol
$$CH_2=\underset{\underset{CH_3}{|}}{C}-CH_2-OH$$

Beta-chloro allyl alcohol
$$CH_2=\underset{\underset{Cl}{|}}{C}-CH_2-OH$$

Table III

Ethylene glycol
$$HO-CH_2-CH_2-OH$$

Propylene glycol
$$CH_3-\underset{\underset{OH}{|}}{CH}-CH_2-OH$$

1,2-butylene glycol
$$HO-CH_2-\underset{\underset{OH}{|}}{CH}-CH_2-CH_3$$

2,3-butylene glycol
$$CH_3-\underset{\underset{OH}{|}}{CH}-\underset{\underset{OH}{|}}{CH}-CH_3$$

Tri-methylene glycol
$$HO-(CH_2)_3-OH$$

Tetra-methylene glycol
$$HO-(CH_2)_4-OH$$

Penta-methylene glycol
$$HO-(CH_2)_5-OH$$

Hexa-methylene glycol
$$HO-(CH_2)_6-OH$$

Hepta-methylene glycol
$$HO-(CH_2)_7-OH$$

Octa-methylene glycol
$$HO-(CH_2)_8-OH$$

Diethylene glycol
$$HO-CH_2-CH_2-O-CH_2-CH_2-OH$$

Triethylene glycol
$$HO-(CH_2-CH_2-O)_2-CH_2-CH_2-OH$$

Tetraethylene glycol
$$HO-(CH_2-CH_2-O)_3-CH_2-CH_2-OH$$

o-, m- or p-dihydroxy benzene

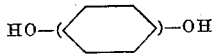

Such a polymerizable monomeric carbon compound thus has the general formula

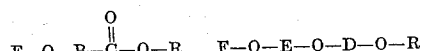

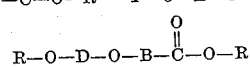

or

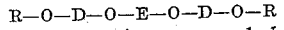

Polymerizable monomeric compounds having the general formula F—O—E—O—D—O—R may be prepared by first reacting one molecule of a dihydroxy compound listed in Table III with one molecule of the monochloride of a half ester of one of the dibasic acids listed in Table I with one of the alcohols listed in Table II, or in some cases of the half ester itself. (For example, a molecule of allyl chlorcarbonate, which has been prepared by reacting one molecule of allyl alcohol with a molecule of phosgene, may be reacted with a molecule of diethylene glycol.) One molecule of the resulting product may then be reacted with one molecule of the chloride of acrylic or methacrylic acid or in some cases of the acid itself.

Polymerizable monomeric compounds having the general formula

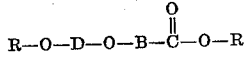

include the diallyl ester of lacto-carbonate and the diallyl ester of hydroxyaceto-carbonate. Other compounds having this general formula, as well as polymerizable monomeric cmopounds having the general formula

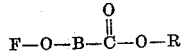

may be prepared by reacting one molecule of an ester of an alcohol listed in Table II with a monobasic hydroxy-substituted, chloro-substituted or bromo-substituted acid, such as glycolic acid, chloracetic acid, lactic acid, alphabromo propionic acid or hydroxy benzoic acid (e. g., allyl lactate), with one molecule of a derivative of acrylic or methacrylic acid or with one molecule of a derivative of a half ester of one of the dibasic acids listed in Table I with one of the alcohols listed in Table II. In case of itaconic acid (Table I), the half ester may also be a half ester of methyl, ethyl, propyl, isopropyl, n-butyl, isobutyl, secondary butyl or tertiary butyl alcohol.

Polymerizable monomeric compounds having the general formula R—O—D—O—E—O—D—O—R include: diallyl ethylene glycol dioxalate, diallyl ethylene glycol dicarbonate, diallyl diethylene glycol dicarbonate, diallyl trimethylene glycol dicarbonate, diallyl ethylene glycol disuccinate, diallyl ethylene glycol diadipate, diallyl diethylene glycol dimaleate, dimethallyl diethylene glycol dicarbonate, diallyl diethylene glycol dimalonate, 2-(oxycarballyloxy) ethyl ethyl fumarate and 2-(oxycarbomethallyloxy) ethyl methyl fumarate.

The polymerizable monomeric carbon compound may also consist of an ester of a molecule of any of the dibasic acids listed in Table I with two similar molecules (or a mixed ester of a molecule of such a dibasic acid with two dissimilar molecules) each of which is an ester of glycolic, lactic or o-, m- or p-hydroxy benzoic acid with any of the alcohols listed in Table II. Such a polymerizable monomeric carbon compound has the general formula

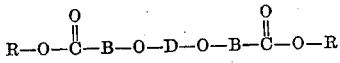

An amino acid such as glycine may be used in place of lactic, glycolic or o-, m- or p-hydroxy benzoic acid, so that the general formula is then

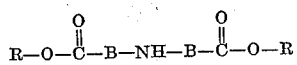

Such monomeric compounds include: carbonyl bis-(methallyl lactate), carbonyl bis(allyl lactate), maleyl bis-(allyl lactate), fumaryl bis(allyl lactate), succinyl bis-(allyl lactate), adipyl bis(allyl lactate), sebacyl bis(allyl lactate), phthalyl bis(allyl lactate), fumaryl bis(allyl glycolate), carbonyl bis(allyl glycolate), carbonyl bis-(allyl salicylate) and oxalyl bis(allyl glycinate).

The polymerizable monomeric unsaturated compound may also consist of an ether of two similar or dissimilar molecules each consisting of an ester of glycolic, lactic or o-, m- or p-hydroxy benzoic acid with any of the alcohols listed in Table II. Such a polymerizable monomeric carbon compound has the general formula

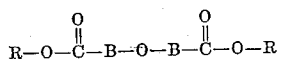

Monomeric compounds having this general formula include: the esters of alcohols listed in Table II with diglycolic acid, with diethyl ether alpha, alpha'-dicarboxylic acid, or with any diphenyl ether dicarboxylic acid in which each of the benzene rings has one carboxyl group attached to it. In the preparation of such a compound, an ether of two hydroxy-substituted acid molecules may first be prepared by reacting the sodium derivatives of glycolic, lactic or any hydroxy-benzoic acid with chloracetic or alpha-chloropropionic acid in accordance with the usual procedure for preparing ethers. The product may then be esterfied with any of the alcohols listed in Table II. If it is desired to prepare a compound of this type whose molecule is an ester of two different alcohols, it may be more convenient to prepare an ester of one of the alcohols listed in Table II with glycolic, lactic or hydroxy-benzoic acid, and then to react the sodium derivative of such ester with the ester of a different alcohol listed in Table II and chloracetic or alpha-chlorpropionic acid, to form the ether linkage.

The polymerizable monomeric unsaturated compound may also consist of an ether of a molecule of ethylene glycol, propylene glycol, 1,2-butylene glycol, 2,3-butylene glycol or o-, m- or p-dihydroxy benzene with two similar or dissimilar molecules each consisting of an ester of glycolic, lactic or o-, m- or p-hydroxy benzoic acid with any of the alcohols listed in Table II. Such a polymerizable monomeric carbon compound has the general formula

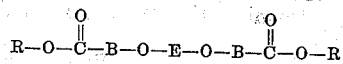

A compound having the general formula

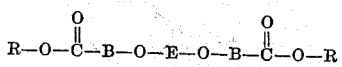

may be prepared by reacting one molecule of a sodium derivative of ethylene, propylene or a butylene glycol or of a hydroxy benzene with two molecules of an ester of chloracetic acid or alpha-chloropionic acid with one of the alcohols listed in Table II, in accordance with the usual procedure for preparing ethers. If an unsymmetrical compound having this general formula is desired, one molecule of the ester of chloracetic or alpha-chloropropionic acid may be reacted with one molecule of the sodium derivative and the product may then be reacted with one molecule of a different ester of such an acid. As an alternative method, one molecule of the dichloro or dibromo compound corresponding to ethylene, propylene or a butylene glycol may be reacted with two molecules of the sodium derivative of the ester of glycolic, lactic or a hydroxy benzoic acid with one of the alcohols listed in Table II.

The polymerizable monomeric compound may also consist of an ester of a molecule of silicic acid with four molecules of an ester of glycolic or lactic acid with any of the alcohols listed in Table II. Such a polymerizable monomeric compound has the general formula

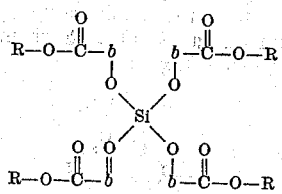

in which $b$ is methylene or methyl methylene and R has the same significance as before. Such compounds include tetra (allyl glycolate) silicate and tetra(allyl lactate)-silicate.

Allyl and diallyl esters, such as diallyl diphenyl phosphonate, carbonyl bis(allyl lactate) and, particularly, diallyl phthalate, are preferred monomers in the practice of the invention.

POLYMER

A composition of the invention also comprises a polymer of a substance having at least one polymerizably reactive $CH_2=C<$ group per molecule.

The term "polymer" is used hereinafter for sake of brevity to include not only the solid polymerized form of a monomeric substance having at least one polymerizably reactive $CH_2=C<$ group per molecule, but also a polymer that consists of the partially polymerized form of such a substance (which may be capable of further polymerization), such as partially polymerized diallyl phthalate. As hereinbefore demonstrated, such a polymer reduces the characteristic tackiness and stickiness of a high monomer content amorphous unsaturated alkyd molding composition so markedly as to permit the composition to be produced in granular rather than putty form.

A polymer which is used in the practice of the invention may be any polymer of a substance having at least one polymerizably reactive $CH_2=C<$ group per molecule which (1) is compatible with the unsaturated alkyd and the monomeric liquid substance, which along with the polymer comprise the binder in a composition of the invention (i. e., the binder in a composition of the invention is a solution of the alkyd, the liquid monomer and the polymer); and (2) does not interfere with the polymerization or cross-linking of the unsaturated alkyd and is compatible with the cured alkyd and monomer. Such a polymer stiffens the consistency or raises the melting point of the binder so that a non-tacky granular molding composition can be prepared upon incorporation of a filler in such binder. The polymers which meet these requirements include polymethyl methacrylate, polymethyl acrylate, polydiallyl phthalate, polydiallyl phenyl phosphonate, and polystyrene. Ordinarily, it is desirable to dissolve the solid polymer in a liquid monomer in which it is soluble. Polymethylmethacrylate, which is soluble in the preferred allyl ester monomers such as diallyl phthalate, is a preferred polymer in the practice of the invention.

FILLER

The filler in a molding composition of the invention may comprise an organic filler (i. e., a filler from a vegetable or animal source) or an inorganic or mineral filler, or combinations of certain inorganic fillers and organic fillers. Organic fillers include alpha cellulose, which is the purest and lightest-colored organic material ordinarily available. Inorganic or mineral fillers include fibrous fillers such as glass fibers or silicate fibers (as hereinafter defined) and non-fibrous fillers such as ground glass or clay.

A non-fibrous inorganic filler which may be used in the practice of the invention is ordinary kaolin (i. e., Georgia clay) or dehydrated kaolin or resin-coated kaolin particles (as hereinafter described). Dehydrated kaolin may be prepared by heating ordinary kaolin in a rotary kiln at a temperature sufficient to drive off the chemically combined water (i. e., at least about 600° C.) but below the temperature which would produce sintering of the kaolin (i. e., about 1200° C.). If desired, a salt or hydroxide of an alkali or alkaline earth metal or of an amphoteric metal (e. g., sodium chloride, potassium chloride, sodium bromide, sodium nitrate, sodium sulfite, sodium hydroxide, calcium chloride, magnesium chloride, aluminum chloride, zinc chloride, or mixtures thereof) may be incorporated in the kaolin before heating. For example, dehydrated kaolin may be prepared by pulverizing ordinary kaolin (600 pounds) and sodium chloride (18 pounds) and heating the mixture in a batch-type rotary kiln for about five hours at a temperature of about 785° C. to produce a loss in weight of about 14.8 per cent of the mixture. If such a procedure is carried out at temperatures ranging from 900 to 965° C. the loss of weight of the mixture is about 15.0 per cent.

The term "resin-coated kaolin particles" is used herein to mean kaolin particles which have been coated with a thermosetting reaction product of formaldehyde and a substance whose molecule has a plurality of $NH_2$ groups each connected to a carbon atom contained in a heterocyclic ring, the carbon atom being connected by a double bond to an intracyclic nitrogen atom, said $NH_2$ groups being resin-formingly reactive with formaldehyde. (Such a substance is referred to hereinafter, for the sake of brevity, as a "heterocyclic polyamine.") The amino groups are resin-formingly reactive with formaldehyde in that they are the functional points in the molecule of the heterocyclic polyamine at which formaldehyde reacts during the resin-forming reaction and in that the reactivity of such amino groups is not impaired appreciably or interfered with by other reactive groups such as, for example, OH groups, in the molecule of the heterocyclic polyamine.

The term "heterocyclic ring" is used herein to include triazole, diazine and triazine rings. When the heterocyclic ring in a heterocyclic polyamine that is reacted with formaldehyde to form a thermosetting reaction product used to coat kaolin particles comprises a triazole ring, the heterocyclic polyamine may be, e. g., guanazole,

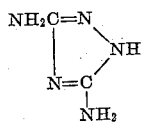

1 phenyl guanazole

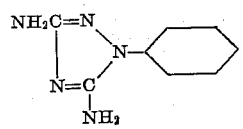

4-aminoguanazole

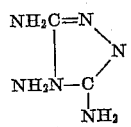

1-carbamyl guanazole

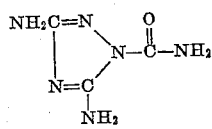

1-guanyl guanazol

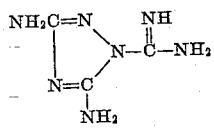

1-acetyl guanazole

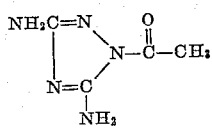

or 1-benzoyl guanazole

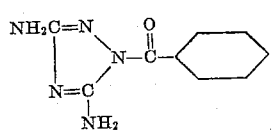

When the heterocyclic ring in a heterocyclic polyamine used in the preparation of resin-coated kaolin particles comprises a diazine ring, the heterocyclic polyamine may be, e. g., a pyrimidine such as 2,4-diamino-6-hydroxy pyrimidine,

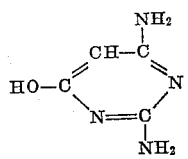

or a guinazoline such as 2,4-diaminoquinazoline,

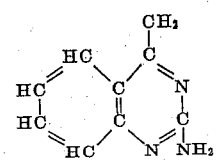

When the heterocyclic ring in a polyamine used in the preparation of resin-coated kaolin particles comprises a triazine ring, the heterocyclic polyamine may be a substance whose molecule contains from one to three triazine rings, and has no functional groups attached to a triazine ring other than the amino groups (such as an amino triazine), i. e., the amino groups are the only functional points in the molecule of the substance at which formaldehyde reacts during the resin-forming reaction. A heterocyclic polyamine used in the practice of the invention that has one triazine ring in its molecule may be (1) a triamino triazine, e. g., melamine,

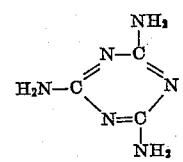

or (2) a diamino triazine (i. e., a monoguanamine) having the general formula

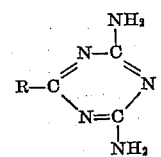

wherein R is a hydrogen atom, a saturated monovalent aliphatic hydrocarbon radical having from 1 to 18 carbon atoms, an aromatic hydrocarbon radical containing 1 benzene nucleus or containing 2 condensed benzene nuclei, a saturated or unsaturated cycloaliphatic hydrocarbon radical, or any of the foregoing radicals containing substituents such as aliphatic, cycloaliphatic, aromatic, alkoxy, aryloxy and acyl radicals. Thus, the monoguanamines used may have varying structures and may be of complex structure so long as they do not contain groups which interfere with the condensation reaction of formaldehyde with the guanamine. Such monoguanamines include, formoguanamine,

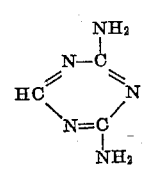

acetoguanamine,

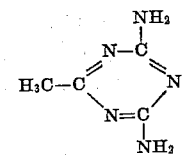

propioguanamine,

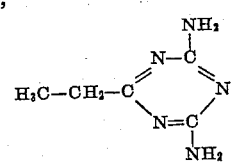

butyroguanamine,

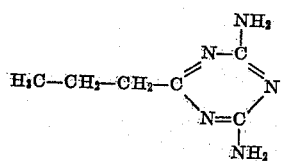

benzoguanamine

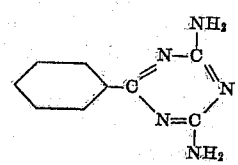

phenylacetoguanamine,

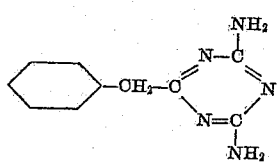

delta-cyano-valeroguanamine,

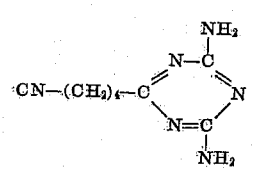

and monoguanamines obtained from the corresponding mononitriles containing as many as 18 carbon atoms, e. g. dodecano-, tetradecano-, or octadecano-nitrile.

A heterocyclic polyamine that has two triazine rings in its molecule may be a diguanamine having the general formula

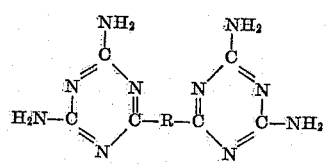

wherein R is a divalent hydrocarbon radical in which the shortest connection between the free valences is not more than eighteen carbon atoms in series and which contains no substituents or contains substituents such as aliphatic, cycloaliphatic, aromatic, alkoxy, aryloxy and acyl radicals, or may be a compound having said general formula that is substituted on not more than two exocyclic nitrogen atoms, the substituents consisting of (a) not more than two monovalent aliphatic hydrocarbon radicals on each substituted nitrogen atom, each having not more than four carbon atoms, each having at least one hydrogen atom attached to the same carbon atom as the free valence, and each having not more than one unsaturation, any such unsaturation being an olefinic unsaturation in the beta-gamma position, (b) not more than one monovalent radical of the benzene series on each substituted nitrogen atom having not more than eight carbon atoms in which the free valence is connected to the nucleus, and (c) not more than one mono-alkoxy phenyl radical on each substituted nitrogen atom having not more than eight carbon atoms. Thus the diguanamines used may have varying structures and may be of complex structures so long as they do not contain groups which interfere with the condensation reaction of formaldehyde with the diguanamine in the practice of the invention.

Such diguanamines include gamma-methyl-gamma-acetyl pimeloguanamine,

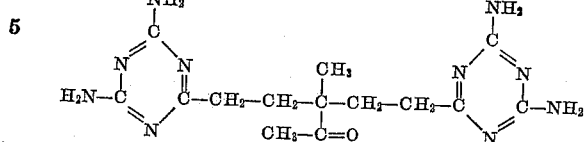

sebacoguanamine,

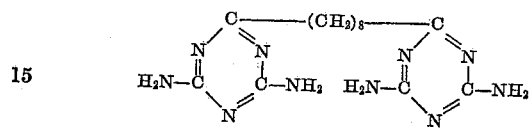

adipoguanamine,

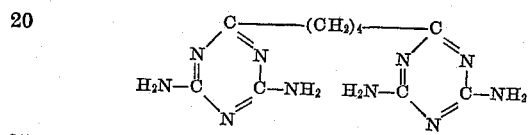

bis-(4,6-diamino-2-triazinyl-ethyl) fluorene,

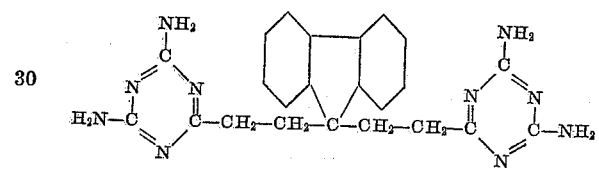

gamma-isopropenyl-gamma-acetyl pimeloguanamine,

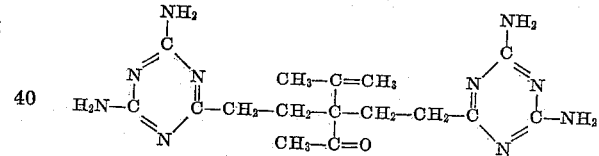

sym. diphenyladipoguanamine,

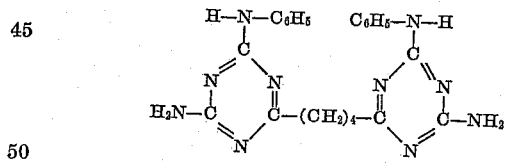

phthaloguanamine,

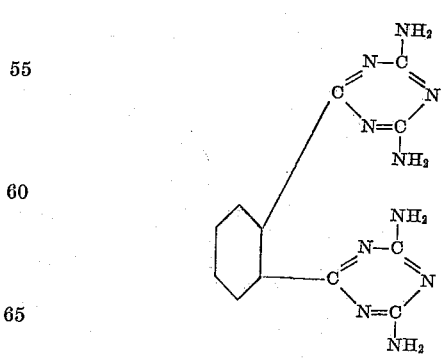

p,p'-bis-2,4-diamino-6-triazinyl diphenyl,

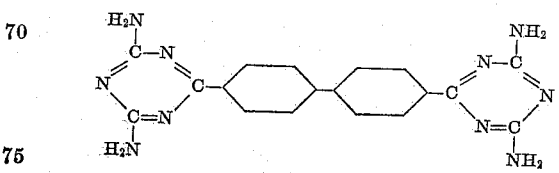

1,2-bis-2,4-diamino-6-triazinyl naphthalene,

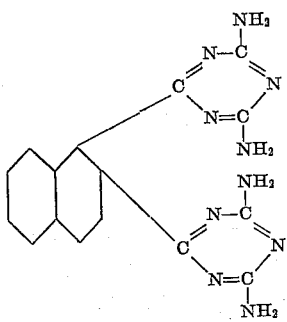

sym-diphenylsebacoguanamine, sym.-di-p-phenetyladipoguanamine, sym-di-o-tolyladipoguanamine, terephthaloguanamine and diguanamines obtained from nitriles such as 2,4-dicyano-diphenyl, 4,4'-dicyanodiphenyl methane, 4,4'-dicyanodiphenyl ethane, and 4,4'-dicyanoalapha, gamma-diphenyl propane.

A heterocyclic polyamine that has three triazine rings in its molecule may be a triguanamine such as gamma-2,4-diamino-6-triazinyl-gamma-phenylpimeloguanamine

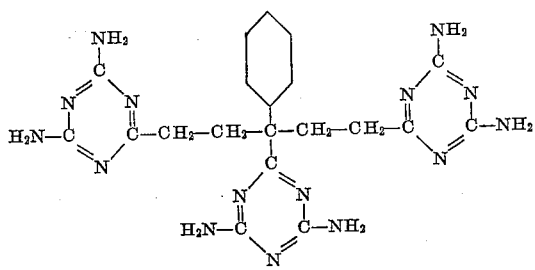

A thermosetting heterocyclic polyamine-formaldehyde reaction product may be obtained by reacting a heterocyclic polyamine, as hereinbefore defined (or a mixture of such amines), either with formaldehyde or with a polymer thereof, such as paraformaldehyde. When used for this reaction, paraformaldehyde is considered to split up so that the substance actually taking part in the reaction is formaldehyde. The heterocyclic polyamine may be reacted with a solution of formaldehyde in water, in an organic solvent such as an alcohol, or in a liquid containing both water and an organic solvent. A water solution is usually preferred. The reaction may be performed in an autoclave, if desired, to secure a reaction temperature above the boiling point of the solvent. Ordinarily, the heterocyclic polyamine is added to a commercial aqueous formaldehyde solution having a pH of about 4, or to such a solution which has been made less acid, or neutral, or alkaline, preferably at a pH between 6 and 8, by addition of any desired base, such as sodium hydroxide, ammonium hydroxide, borax or triethanolamine.

In general, the proportion of formaldehyde actually reacting may range from one-half to a maximum of two molecules for each amino group. An excess of formaldehyde above this maximum may be used for the reaction if desired, although an uncombinable excess of one of the reactants usually is not desirable in the final product. Because of the complexity of the molecules of the reaction products that are produced, the proportion of formaldehyde actually reacting may vary freely between the limits stated. The preferred proportions vary, of course, with the specific substance that is reacted with formaldehyde. For example, when the substance is melamine, the preferred proportions are about 3 mols of formaldehyde for each mol of melamine. Other examples of preferred molar ratios of formaldehyde to a heterocyclic polyamine in the preparation of a resinous reaction product for the coating of kaolin particles are 2:1 for guanazole, or 1-carbamyl guanazol, 4:1 for 2,4-diamino-6-hydroxy pyrimidine, 3:1 for 2,4-diamino-quinazoline, 2:1 for formoguanamine, acetoguanamine or benzoquanamine and 5:1 for adipoguanamine or sebacoguanamine.

The reaction proceeds at normal temperatures, but heating ordinarily is desirable to shorten the time of reaction, or, in some cases, to dissolve the substance to be reacted with formaldehyde. The desired resin solution ordinarily is obtained by carrying the reaction only to its earliest stage, for example, the stage at which the reacting ingredients have just dissolved to form a solution, or for a few additional minutes thereafter.

When the reaction between formaldehyde and a heterocyclic polyamine is substantially complete, the solution of the reaction product is used to coat kaolin particles by the procedure hereinafter described. The preferred heterocyclic polyamine is melamine, since melamine-formaldehyde resin-coated kaolin particles in particular enhance the excellent wafer resistance and electrical properties of compositions of the invention.

In the preparation of resin-coated kaolin particles, a heterocyclic polyamine-formaldehyde reaction product solution, prepared as hereinbefore described, is diluted with water or any suitable solvent so that the volume of the resin solution is such that it may be used to deposit only a very small amount of the resin as a coating on the kaolin, the extent of the dilution varying, of course, with the procedure employed for applying the resin to the kaolin, as is hereinafter further discussed. The dilution should be made carefully so that the resin does not precipitate as the water is added. It is desirable that before dilution the pH of the resin solution be adjusted (e. g., with dilute lactic acid) so that it is on the slightly acid side, to prevent precipitation of methylols upon dilution and to promote condensation of the resin.

When the reaction product has thoroughly coated the kaolin particles, it is desirable that the material be subjected to strong heating, since the heterocyclic polyamine-formaldehyde reaction product should be in at least a relatively advanced state of condensation. It is ordinarily desirable that the reaction product be in an infusible state, but at least the resin on the kaolin particles should be sufficiently condensed that neither water nor formaldehyde will be liberated during further processing operations in the preparation of a composition of the invention. Although the slightly acid pH of the coating solution may aid the cure initially, several hours of heating may be necessary at an elevated temperature to bring the resinous substance to a sufficiently advanced state of condensation (or to an infusible state, in accordance with the preferred procedure). Any desired method may be used to coat the kaolin particles with the resin, so long as care is taken to avoid agglomeration of the kaolin particles. Of course, the preferred procedures are those which result in the least change in the physical characteristics of the kaolin particles. For example, the kaolin may be stirred into a highly dilute solution of the desired resin to form a slurry that can be readily atomized for spray drying to obtain finely-divided resin-coated kaolin particles, or the slurry can be vacuum drum-dried and ball-milled or hammer-milled to a finely pulverized form. Alternatively, a dilute resin solution may be absorbed on the kaolin particles in a mixer and the resulting mass dried on trays at an elevated temperature (e. g., at about 160° F.) before grinding it to the desired particle size by a known procedure.

The proportion of a heterocyclic polyamine-formaldehyde reaction product solution used to coat kaolin particles may vary with the specific reaction product employed as well as with the degree of improvement in properties that is desired. Ordinarily, it is preferred that approximately 2 to 30 per cent of the final dry coated kaolin particles consist of the thermosetting heterocyclic polyamine-formaldehyde reaction product (preferably in its infusible state), and it is most desirable that from about 5 to about 15 per cent of the final dry coated kaolin particles consist of the reaction product. (The terms "per cent" and "parts" are used herein to mean per cent and parts by weight unless otherwise specified.)

If the heterocyclic polyamine used is one that reacts so rapidly with formalin that the reaction product reaches the insoluble state almost immediately after the reactants are mixed and heated (guanazole is an example of such a heterocyclic polyamine), it is preferable simply to mix the polyamine and the formalin at room temperature and then to add the water of dilution, and the acid to adjust the pH. The relatively clear solution so obtained is then mixed with the kaolin particles, which are thoroughly dried in accordance with any of the procedures hereinbefore described. Thus, the reaction between the heterocyclic polyamine and formaldehyde actually takes place on the kaolin particles during the drying operation.

A fibrous inorganic filler used in the practice of the invention may consist of fibers of crystalline fibrous silicates consisting essentially of anhydrous silicates of divalent metals (or such fibers which are resin-coated).

Crystalline fibrous silicates consisting essentially of silicates of divalent metals are obtained from relatively few families, the most important of which are the serpentines and the pyroboles. The most important fibrous serpentine is chrysotile, $3MgO.2SiO_2.2H_2O$, a hydrous silicate of magnesium, generally referred to simply as "asbestos" because of its industrial prevalence. The fibrous silicates that are preferably employed in the practice of the invention are anhydrous and are therefore distinguished from the serpentines, such as chrysotile, which are hydrous silicates. A mineral sometimes classified as a fibrous pyrobole is crocidolite, $Na_2O.Fe_2O_3.2FeO.6SiO_2$ (with up to about one mole of $H_2O$ of hydration). The fibrous silicates that are preferably used in the practice of the invention are silicates of divalent metals and are, therefore, distinguished from crocidolite which consists essentially of silicates of metals other than divalent metals.

Although the crystalline silicate mineral fibers which are preferably used in the practice of the invention (for the sake of brevity, hereinafter referred to simply as "silicate fibers") may be fibers of any one or more of the crystalline fibrous minerals consisting of anhydrous silicates of divalent metals, practically the only members of this group which are available for industrial purposes are members of the pyrobole family. The pyroboles that are preferably used as fillers in the production of compositions of the invention are minerals consisting essentially of silicates of divalent metals having the general chemical composition: $MO.SiO_2$, wherein M is a divalent metal; but they may also contain small amounts of monovalent metals (e. g., sodium or potassium) and trivalent metals (e. g., ferric iron and aluminum). Examples of the pyroboles that may be used in the practice of the invention include:

Diopside, $(Ca,Mg)O.SiO_2$, essentially a silicate of calcium and magnesium;
Wollastonite, $CaO.SiO_2$, a relatively pure silicate of calcium;
Anthophyllite, $(Mg,Fe)O.SiO_2$, essentially a silicate of iron and magnesium, usually with a little aluminum;
Tremolite, $3MgO.CaO.4SiO_2$, a relatively pure silicate of magnesium and calcium;
Actinolite, $3(Mg,Fe)O.CaO.4SiO_2$, similar to tremolite, but containing at least 3 per cent by weight of FeO; and
Others descriptively named mountain leather and mountain cork.

The pyroboles are further classified in two distinct classes or families, viz. amphiboles and pyroxenes. According to J. W. Mellor in "Inorganic and Theoretical Chemistry" (Longmans, Green and Co., 1925) volume VI, pages 390 to 391, diopside and wollastonite are pyroxenes; and anthophyllite, tremolite and actinolite are amphiboles. The amphiboles have a different angle of cleavage (and are thereby distinguished from the pyroxenes, which have substantially the same chemical composition as the amphiboles. Although the amphiboles and pyroxenes have certain differences, they also have certain fundamental similarities, such as the ability to undergo isomorphism, which is a characteristic of the pyroboles which may be used in the practice of the invention. In general, the crystalline structure of such silicate fibers is understood to comprise a number of substantially parallel silicon-oxygen chains having therebetween metallic ions which form cross-links between the chains through co-ordinate linkages with oxygen atoms in the chains, as represented by the following structure:

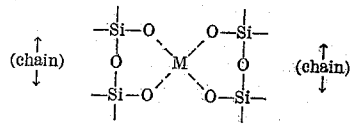

wherein M is a metallic ion having at least four co-ordinate valences (the co-ordinate bonds being represented by broken lines and the ordinary bonds by solid lines). Although the silicon-oxygen atomic arrangement in the chains of each of such silicates is analogous to the atomic arrangement of high polymer resins, in that it involves a number of repeating units, the specific arrangement of each silicate is different.

In its fundamental aspects isomorphism relates to the ability of certain ions to replace other ions in a crystal structure without causing any essential alteration in the crystal structure. Thus in the case of tremolite, for example, which is a relatively pure silicate of magnesium and calcium, the crystal structure is understood to comprise magnesium and calcium ions, in an orderly arrangement, cross-linking the various chains of the amphiboles through coordinate linkages. However, if another metal such as iron were present during the formation of tremolite crystals, certain of the positions which would normally be occupied by magnesium or calcium ions in the crystal may be occupied by ferrous or ferric ions. The phenomenon of isomorphism permits such substitution of a ferrous or ferric ion for a magnesium or calcium ion without causing any essential alteration in the crystal structure. The amount of iron so incorporated in the crystal structure may be quite substantial, or it may be so very slight that it appears merely as an impurity, depending upon the particular circumstances involved. In most instances, ferrous, manganese and magnesium ions are completely interchangeable; calcium ions may be replaced entirely by ferrous or magnesium ions; but aluminum and ferric ions may replace magnesium ions only to a limited extent. The chain structure of the pyroxenes is different from that of amphiboles, but the isomorphic properties of the pyroxenes are about the same as the amphiboles.

Certain other atomic structures may occur in such crystalline fibrous silicates, either as a part of the "standard" or most commonly known composition of the mineral or as a result of isomorphous substitution more radical in character than the mere substitution of one polyvalent metallic ion for another. For example, combined water (as —OH groups) may be present in slight amounts in the crystalline structure of a pyrobole. As hereinbefore mentioned, the pyroboles are anhydrous silicates, but it is, of course, a practical impossibility to obtain an absolutely anhydrous silicate mineral. A small amount of combined water, for example, not more than about 0.2 mol per mol of $SiO_2$, is often present in the pyroboles. The fundamental or "standard" compositions of the pyroxenes do not indicate the presence of any combined water; but the most recently published "standard" compositions of the amphiboles indicate that a very small amount of combined water is present as a part of the basic crystal structure. In any event, the minute amount of combined water present may vary because of limited isomorphism; and the pyroboles are anhydrous as contrasted to chrysotile ($3MgO.2SiO_2.2H_2O$), for example, in that the pyroboles do not contain more than about 0.2 mol of $H_2O$ per mol of $SiO_2$. Fibrous silicates containing combined $H_2O$ in amounts above the foregoing maximum do not give the most superior results that may be obtained in the practice of the present invention.

In most fibrous silicates isomophism is limited; i. e., partial replacement of one type of metallic ions in a mineral does not change the mineral per se but very substantial or complete replacement of such ions results in a new mineral. On the other hand, such new mineral may or may not be a member of the same mineral family. For example, partial placement of magnesium ions by ferrous ions in anthophyllite may not yield a mineral that is not "anthophyllite," but a very substantial replacement of the magnesium ions by ferrous and ferric ions may yield a mineral known as "amosite," sometimes referred to as an "iron-rich" anthophyllite. Amosite is recognized as a different mineral from anthophyllite, although it is also classified as an amphibole, and may consist of anhydrous silicates of divalent metals as hereinbefore defined. Although the crystalline structures of the other fibrous silicates which may be used in the practice of the invention are somewhat different from the amphibole structure (e. g., the pyroxene structure has a simpler chain arrangement), the fundamental principles of isomorphism apply to these crystalline structures in like manner.

The fibrous silicates which may be used as fillers in molding compositions of the invention naturally differ among themselves in respect to the improvements they impart, to some extent, and also in respect to certain other valuable characteristics. For example, the amphiboles (particularly tremolite and anthophyllite) appear to possess stronger and more flexible fibers than the pyroxenes, and the amphiboles therefor are preferred in the practice of the invention. Also, the amphibole fibers (particularly anthophyllite) impart the best storage stability to molding compositions of the invention. On the other hand, other characteristics may be controlling in the selection of silicate fibers. For example, the most pronounced improvement in water resistance is obtained in products containing anthophyllite or wollastonite fibers, and therefore such fibers are preferred when maximum water resistance is desired. At present, anthophyllite is the least expensive pyrobole and, therefore, its fibers are preferred if low cost is important. On the other hand, if color is a controlling factor, the fibers of the white pyroboles (e. g., tremolite, wollastonite, diopside, and actinolite in some instances) are preferred.

Fibrous silicates for use in the practice of the invention are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use in the invention, since such fibers usually contain a substantial amount of mineral impurities which affect deleteriously many of the properties of the products of the invention. The necessity and extent of purification for the purposes of the invention are determined by the nature of the impurities, their effect on the mechanical strength of molded articles and their damaging effect on the mold itself. Silicate fibers sufficiently purified for the purposes of the invention may be obtained by carrying out a simple flotation process, e. g., by introducing water continuously into the bottom of a vessel equipped with an overflow and containing the silicate fibers, so that the impurities remain at the bottom of the vessel and the purified fibers float out with the overflowing water. If extreme purity of the fibers is required, tremolite fibers are preferred, since tremolite occurs naturally in a very pure state and often requires little or no further purification.

Fibrous silicates, as contrasted to massive silicates occur in various lengths ranging up to as much as 7 inches. The fiber lengths are reduced substantially in the ordinary milling process, although in some instances the initial fibers are of a short needle-like or rod-like structure. No particular fiber length is required for use in the practice of the invention. For example, the fibers may be ground down to the size of ordinary fibrous fillers used in molding compounds, i. e., the fiber lengths of groups No. 6 and No. 7 of the Canadian Asbestos classification, at which the fibers appear to the naked eye to be similar in form to sawdust.

Silicate fibers coated with a thermosetting reaction product of formaldehyde and a heterocyclic polyamine may be prepared by any of the procedures hereinbefore described for preparing resin-coated kaolin particles, the proportion of the reaction product employed preferably being such that it comprises from about 2 to about 25 per cent of the final coated fibrous silicate filler, and most desirably from about 5 to about 15 per cent of the final coated fibrous silicate filler.

The use of resin-coated silicate fibers or resin-coated kaolin particles as a filler in a polymerizable unsaturated alkyd molding composition improves the water resistance and electrical properties of the composition. When the resin used to coat the filler is a melamine-formaldehyde resin, the flame resistance of the composition is also improved.

Although any of the inorganic fillers hereinbefore described (i. e., kaolin, dehydrated kaolin, resin-coated kaolin particles, glass fibers, silicate fibers, or resin-coated silicate fibers) may be used as the sole filler in a molding composition of the invention, it is preferable that the filler comprise a combination of fibrous and non-fibrous inorganic fillers. For example, a filler combination comprising dehydrated kaolin and silicate fibers (e. g., anthophyllite fibers) not only imparts better molding properties to a polymerizable unsaturated alkyd composition than the molding properties of an alkyd composition containing dehydrated kaolin as the sole filler, but the use of such a filler mixture also improves the impact strength of articles molded from the composition. The preferred combinations of fillers include: Mixtures of kaolin (or dehydrated kaolin or resin-coated kaolin) and silicate fibers, and mixtures of resin-coated silicate fibers and kaolin or resin-coated kaolin.

Fillers comprising mixtures of kaolin (or, preferably, resin-coated kaolin particles) and cellulose may also be used in the practice of the invention. The term "cellulose" is used herein to include any form of cellulose filler, for example, alpha cellulose, shredded paper, chopped cloth (e. g., canvas), cotton flock, cotton linters, purified wood fibers in finely ground forms or in felted-fiber forms, cotton cord or regenerated cellulose. Resin-treated cellulose (i. e., cellulose which has been impregnated with a thermosetting heterocyclic-polyamine formaldehyde reaction product converted to its infusible state on the cellulose) is prepared by a procedure similar to that described for the preparation of resin-coated kaolin particles. A dilute heterocyclic polyamine-formaldehyde reaction product solution is prepared as hereinbefore described, the weight of the dilute solution being from two to three times the weight of the cellulose to be treated. (The weight of the cellulose is always taken as its bone dry weight. The cellulose employed need not be bone dry, of course, so long as its water content is accounted for in calculating its weight.)

When the reaction product has thoroughly impregnated the cellulose filler, it is essential that the material be thoroughly dried and that the resinous reaction product be cured on the filler to the infusible state, as hereinbefore described. The completeness of cure may be checked from time to time during the curing operation by boiling a sample of the treated filler in water. If the cure is still incomplete, a cloudy solution will result because of dissolved resinous reaction product. On the other hand, if the solution is clear, complete cure is indicated.

The proportion of a heterocyclic polyamine-formaldehyde reaction product solution used to impregnate a cellulose filler should be such that from 2.5 to 40 per cent of the final treated dry filler consists of the heterocyclic polyamine-formaldehyde reaction product in its infusible state. It is preferred that the proportion of the reaction product solution be such that from about 14 to about 25 per cent of the final treated filler consists of the reaction product in its infusible state.

The improvements obtained in the practice of the invention are enhanced when the filler comprises a base of a metal of Group II of the periodic system. In addition to reducing the tackiness of a polymerizable unsaturated alkyd molding composition of the invention, as hereinafter further discussed, such a metal base imparts a certain stiffness to the composition, thereby making the composition much easier to handle industrially. Also such a metal base in a polymerizable alkyd composition reduces substantially the tendency of the composition to stain or corrode a steel mold. Furthermore, such a base not only imparts a substantial improvement in the physical and chemical properties of the composition but also imparts an improvement in the water-resistance and electrical properties of articles molded from the composition. One of the functions of the metal base is the neutralization of the free carboxylic acid radicals in the alkyd (although the improvements obtained by the use of a metal base cannot be explained fully as being the result of such neutralization); therefore, a metal base, such as an oxide, which does not release a volatile material during neutralization is preferred.

The metals of Group II of the periodic system include magnesium (atomic weight=24.3), calcium (atomic weight=40.1), zinc (atomic weight=65.4), strontium (atomic weight=87.6), cadmium (atomic weight=112.4), barium (atomic weight=137.4) and mercury (atomic weight=200.6). It is believed that beryllium (atomic weight=9) and radium (atomic weight=226.0) are too rare and expensive to be considered, and, accordingly, the metal of Group II having atomic weights between 10 and 220 are the metals from which the base is formed that may be used in the practice of the invention.

A metal base may be defined as a compound which reacts with an acid to replace the "acid" hydrogen atom with the metal cation of the metal base, thereby forming the metal salt of such acid. Such a definition necessarily makes the meaning of the term "metal base" dependent, in part at least, upon the acid present. It is to be understood that the base of a metal of Group II (as referred to herein) is one that is in fact a metal base with respect to the polymerizable alkyd, which is present in the practice of the invention. In other words, the metal base is a compound which releases its cation to replace the hydrogen of the carboxy radicals in the polymerizable alkyd. Presumably, such a carboxy radical acts as an acid in that it displaces acids weaker than itself from their salts, but will not displace acids stronger than itself from their salts. However, the term "metal base" does not include those metal salts, such as zinc stearate, which are used as lubricants or other modifiers in a polyester resin, because the salts of such long chain (i. e., over 6 carbon atoms) carboxylic acids apparently are not reactive enough to release the metal cation to replace the hydrogen of the carboxy radicals.

It has been found that the metal base used in the practice of the invention must be the substitution product of a substance with a labile hydrogen atom, having a dissociation constant (for the hydrogen) at least as small as about $3 \times 10^{-7}$, in which the labile hydrogen atom has been replaced by a valence of a metal of Group II. In other words, in order that a compound of such a metal may be basic, it must be a compound of such a metal with a substance having a dissociation constant (for the labile hydrogen atom) equal to or less than that of carbonic acid. The most common examples of such metal bases include the oxides, hydroxides, borates, carbonates, and alcoholates such as the methoxides and ethoxides of such metals. Zinc oxide and barium carbonate are particularly desirable metal bases in the practice of the invention.

PREPARATION OF MOLDING COMPOSITION

A catalyst for the polymerization of the alkyd is ordinarily present in a molding composition of the invention, along with the usual additives such as mold lubricants, plasticizers and coloring matter, the amount used in the case of each of such additives being the usual amount consistent with its particular function in the molding composition.

It is preferable first to dissolve the polymer in the liquid monomer to form a viscous polymer solution. Although a polymer, such as polymethyl methacrylate, may be dissolved in a monomer such as diallyl phthalate, the polymer may be dissolved in its corresponding monomer. Thus, polystyrene may be dissolved in styrene, or a diallyl phthalate polymer or a diallyl phenyl phosphonate polymer may be dissolved in diallyl phthalate or diallyl phenyl phosphonate, respectively. The solution of the polymer in the monomer is then mixed with the unsaturated alkyd, and the resulting polymerizable binder is then mixed with the filler, a catalyst and any other additives in the proper proportions, until a homogeneous dough-like composition is obtained. Mixing of the filler with the other ingredients may be carried out in any suitable mixing or kneading apparatus, e. g., by using any commercial mixer or by milling the filler into the material in a heated two roll (differential speed) rubber mill. Mixing may be carried out at room temperature if the binder is not too viscous. If the viscosity of the binder is too great, it may be necessary to warm the binder to reduce its viscosity when it is mixed with the filler. In any case, it is desirable to mix the binder in a liquid state with the filler so that the filler becomes thoroughly mixed with the binder.

When a homogeneous composition is obtained it may be rolled into thin sheets which can be granulated (usually to a particle size not greater than about 1/8 inch) by any of the well-known industrial devices for reducing material to particulate form by a cutting action. Although one of the simplest methods of granulating the material involves pressing the material through a fine mesh screen, it is preferable from an industrial point of view to employ devices capable of effecting a high speed cutting action. It has been found that when the material is subjected to a high speed cutting action (either by causing rapidly moving blades to strike the material or by causing the material to be thrown at a high speed against stationary blades) the benefit of impact as well as shearing force is obtained and division of the material into fine particles is accomplished in a very satisfactory manner. Industrial devices which employ a high speed cutting action (and which are preferred therefore) include the Abbe Cutter, the Wiley Mill and the Fitzpatrick Comminuting Machine.

The preferred catalyst for use in the practice of the invention is benzoyl peroxide, but any other organic peroxide (not containing polymerization-inhibiting radicals), such as succinyl peroxide, t-butyl perbenzoate, di-t-butyl perphthalate, acetyl peroxide, peracetic acid, perbenzoic acid, toluoyl peroxide, p-bromobenzoyl peroxide, anisoyl peroxide, chloroacetyl peroxide, acetyl benzoyl peroxide, diacetyl peroxide and furoyl peroxide; or any organic ozonide (not containing polymerization-inhibiting radicals), such as di-isopropylene ozonide or di-isobutylene ozonide, or a mixture of such substances may be used as the curing catalyst.

The proportion of curing catalyst used in the production of a molding composition of the invention is simply the proportion that causes the composition to polymerize at the desired rate, and as the term "catalyst" implies, such proportion is the usual catalytic amount, i. e., ranging from about 0.01 per cent to about 5 per cent of the composition. The preferred proportion of curing catalyst varies with different catalysts, and the amount of any particular curing catalyst required to produce a given rate of hardening may vary also with variations in the nature of the polymerizable composition.

As hereinbefore stated, although a non-tacky granular free-flowing alkyd molding composition is commercially desirable, the production of such a composition from a non-crystallizing type of unsaturated alkyd heretofore has presented considerable difficulty. For example, in order to produce such a composition heretofore, from a non-crystallizing alkyd, it was necessary to maintain the viscosity of the resin high enough so that it would become fluid only at mixing temperatures (to permit incorporation of the filler). Upon cooling, a material that could be granulated was obtained as a reult of the loading with filler and the change in the viscosity of the resin with the change in temperature. It is impossible to mix satisfactorily a resin that is too viscous, whereas a tacky or sticky final molding composition results from a resin that is too fluid. Heretofore, to maintain this delicate viscosity balance, it has been necessary to use only a small amount of an unsaturated liquid monomer. Yet it is well-recognized in the art that the incorporation of such a liquid monomer in a greater quantity in an alkyd molding composition improves the water resistance and insolubility of articles molded from the composition, and thus permits the articles to retain good mechanical and electrical properties upon exposure to moisture.

It has been found that a relatively large quantity of a liquid monomer may be incorporated in a molding composition of the invention, to improve the water resistance and insolubility of articles molded from the composition without impairing the granular, free-flowing form of the composition, because the presence of the solid polymer in the composition stiffens the composition so that it can be granulated. Although such a polymer in a composition of the invention produces an improvement in the quality of the articles that can be molded from the composition in that it permits the use of an additional proportion of a liquid monomer without rendering the composition tacky, a superior solid polymer such as polymethyl methacrylate, polystyrene or polydiallyl phthalate functions itself to impart improved water resistance to articles molded from the composition.

The proportion of a liquid unsaturated monomer in a molding composition of the invention should be higher than 10 per cent of the combined weight of the unsaturated alkyd and said liquid monomer, in order to achieve the improvements afforded in the practice of the invention. Preferably, however, the proportion of a liquid unsaturated monomer in a molding composition of the invention is at least 20 per cent of the combined weight of the unsaturated alkyd and said liquid monomer. The maximum proportion of such a substance which may be used without losing the granular form of the composition is, in general, about 36 per cent of the combined weight of the unsaturated alkyd and said substance, but a preferred maximum is about 25 per cent. Of course, the maximum proportion of a liquid unsaturated monomer that can be used in a molding composition of the invention depends on several factors, such as the proportion of solid polymer, the proportion and type of filler and the type of unsaturated alkyd. That is, with the maximum proportion of monomer, the proportion of polymer must be sufficient to render the molding composition non-tacky and granular. In general, the proportion of polymer may be from .1 of the amount of unsaturated liquid monomer to equal the amount of liquid monomer, but the amount of polymer required varies in accordance with the form which the filled composition assumes when no polymer is present. That is, if a tacky filled composition is a rather stiff putty, the proportion of polymer required to render it non-tacky and granular is, of course, less than the proportion required if the tacky filled composition is a soft putty. Thus, with the maximum proportion of monomer which may be present in a granular composition of the invention, it is assumed that the proportion of polymer and the proportion and type of filler are such that the filled molding composition is a non-tacky, granular molding composition.

The term "non-tacky" is applied to compositions of the invention to indicate that such compositions do not tend to coalesce, i. e., are non-lumping, under ordinary storage conditions. A composition which may be granulated but the granules of which are tacky or sticky will cake and lose its free-flowing form when the composition is placed in a container, as it ordinarily is during storage. Obviously, a material comprising an abnormally high filler content (e. g., 95 per cent) with a relatively low resin content (e. g., 5 per cent) is non-tacky, since any tackiness possessed by the resin is masked by the large excess of filler. Such a material is not a molding composition, however, because its resin content is too low to render the material plastic at molding temperatures and pressures. Nor is such a material granular, since there is insufficient resin to bind the filler particles together in granules. On the other hand, an extremely low proportion of filler with a relatively high proportion of resin gives a composition that is a putty regardless of the characteristics of the resin if the resin is a non-crystallizing alkyd.

In general, the proportion of filler in a molding composition of the invention may range from the minimum amount capable of appreciably improving the physical properties of the hardened product (i. e., about 50 per cent of the composition) to the maximum proportion which may be held together or bound satisfactorily by the binder (i. e., about 85 per cent of the composition).

Ordinarily, when the filler in a composition of the invention is a non-fibrous inorganic filler (i. e., kaolin, dehydrated kaolin or resin-coated kaolin particles) it may be from about 50 to about 85 per cent of the composition. It is preferred, however, that a non-fibrous inorganic filler be from about 62½ per cent to about 72½ per cent of the composition.

Ordinarily, when the filler in a composition of the invention is a fibrous inorganic filler (i. e., a fibrous silicate filler or a resin-coated fibrous silicate filler), it may be from about 50 to about 75 per cent of the composition, and preferably is from about 60 to about 70 per cent of the composition.

When the filler in a composition of the invention comprises a mixture of fibrous and non-fibrous inorganic fillers, it is preferred that the proportion of filler be from about 60 per cent to about 70 per cent of the molding composition. At least an appreciable amount of both the fibrous and non-fibrous inorganic fillers is used in such a mixture in order to obtain the benefit of the improvements which are imparted by each type of filler. As a rule, the proportion of non-fibrous filler to fibrous filler in the mixture may range from the minimum proportion at which the effect of the non-fibrous filler is noticeable (i. e., about 1:100) to the maximum proportion at which the effect of the fibrous filler is noticeable (i. e., about 6:1), the preferred proportions being in the upper portion of the range, for economic reasons. The optimum results are obtained at a ratio of non-fibrous to fibrous filler ranging from about 1:1 to about 2:1.

When the filler comprises a mixture of a non-fibrous inorganic filler and cellulose (as hereinbefore described), the proportion of non-fibrous filler to cellulose may range from about 4:1 to about 1:4, the total proportion of such filler mixture in a composition of the invention preferably being from about 55 per cent to about 65 per cent of the composition.

The full benefit of the use of a base of a metal of Group II of the periodic system (as hereinbefore described) in the practice of the invention is obtained simply by incorporating the metal base in the composition in the same manner as any filler, according to the procedures hereinbefore described. The metal base may be incorporated in a separate step or at the same time as the fillers hereinbefore mentioned. In fact, although the metal base has several chemical functions, it also functions physically as part of the filler. In determining the total amount of filler, the amount of metal base is added to the amount of other inorganic filler used, and the total proportion of inorganic filler thus calculated should be within the limits hereinbefore described.

In actual practice the amount of the metal base used may range from a mere appreciable amount based on the chemical function of the metal base (i. e., the slightest excess over that amount required to neutralize the alkyd, so that even with a theoretically complete reaction there would still be a slight amount of metal base present) to a maximum proportion which depends upon the properties of the individual metal base. The considerations involved include the alkalinity, chemical activity and solubility of the metal base, as well as the physical character of the metal base when it is considered merely as a portion of the inorganic filler. Ordinarily the metal base is sufficiently inactive and insoluble so that the essential consideration in the determination of the maximum proportion is purely a physical matter, and such a base is considered a part of the filler. In a molding composition embodying the invention the preferred proportion of such a metal base ranges from about 2 per cent to about 20 per cent of the total filler. As hereinbefore stated, the use of a base of a metal of Group II of the periodic system such as zinc oxide or barium carbonate greatly improves the water resistance and electrical properties of molded compositions of the invention. Such metal bases also contribute to the non-tacky granular form of the present compositions. Thus, when a metal base is used, the filler content of the compositions should not be in the upper portions of the ranges hereinbefore described (e. g., in general the filler should not be more than about 70 to 75 per cent of the composition, although, of course, this range may vary with specific fillers), in order to avoid a powdery composition. On the other hand, when the proportion of filler is in the lower portion of the range (e. g., 50 to 60 per cent), a metal base may be required in order to avoid a tacky granular composition or even a putty.

The following examples illustrate the practice of the invention:

EXAMPLE 1

Non-tacky granular molding compositions of the invention are prepared as follows:

A polymerizable unsaturated alkyd (prepared by esterifying 0.8 mol of maleic anhydride and 0.2 mol of phthalic anhydride with 0.85 mol of monoethylene glycol and 0.2 mol of propylene glycol, in the presence of an amount of hydroquinone equal to 0.06 per cent of the charge, by the procedure hereinbefore described, to an acid number of about 23.7) is mixed in a Banbury mixer with a solution of a polymer (polymethyl methacrylate) in a monomer (diallyl phthalate), a catalyst, anthophyllite fibers, dehydrated kaolin, resin-coated kaolin particles, zinc oxide and zinc stearate. (The solution of polymer in monomer is a gummy mass prepared by masticating the two substances in a dough mixer for four to twenty-four hours until a homogeneous mixture is obtained. The resin-coated kaolin particles are prepared as follows: A reaction mixture of a hetercyclic polyamine (9 parts of melamine), formalin (17.4 parts) and water (206.6 parts) is heated to 80 degrees C. and held at that temperature for ten minutes, the pH being adjusted to 6.8 to 7.0 with dilute lactic acid as soon as a clear solution is obtained. The resulting resin solution is then cooled to 60 degrees C. before stirring in kaolin (120 parts) to make a relatively thin slurry. This slurry is then spray-dried at an air inlet temperature of 500 to 600 degrees F. and an air outlet temperature of about 275 degrees F. The mixing is continued until a homogeneous dough is obtained. The material is then passed through warm rubber rolls to form sheets of a thickness of approximately ⅛ inch. The sheets are allowed to solidify fully while at a temperature between 80 and 90 degrees F. and are then granulated in a high speed cutter to a maximum particle diameter of about ⅛ inch.

Table 1 below more specifically describes the compositions prepared by the above procedure, by specifying the proportion of the unsaturated alkyd (line 1); the proportion of polymer (line 2); the proportion of monomer (line 3); the proportion of catalyst (line 4) and the proportions of anthophyllite fibers, dehydrated kaolin, resin-coated kaolin particles, zinc oxide and zinc stearate (lines 5, 6, 7, 8 and 9, respectively). The catalyst in compositions A and B is "Luperco ATC." In compositions C, D and E the catalyst is "Luperco AS" (a solid finely-divided catalyst consisting of 95 per cent benzoyl peroxide and 5 per cent stearic acid).

*Table 1*

| Component | Composition | | | | |
| --- | --- | --- | --- | --- | --- |
| | A | B | C | D | E |
| 1. unsaturated alkyd (parts) | 1,247 | 1,211 | 1,186 | 1,186 | 1,127 |
| 2. polymethyl methacrylate (parts) | 80 | 58 | 135 | 107 | 102 |
| 3. diallyl phthalate (parts) | 484 | 520 | 539 | 539 | 512 |
| 4. catalyst (parts) | 69 | 69 | 33 | 36 | 36 |
| 5. anthophyllite (parts) | 1,200 | 1,200 | 1,200 | 1,200 | 1,200 |
| 6. dehydrated kaolin (parts) | 1,320 | 1,320 | 1,320 | 1,320 | 1,380 |
| 7. resin-coated kaolin (parts) | 1,380 | 1,380 | 1,320 | 1,320 | 1,380 |
| 8. zinc oxide (parts) | 300 | 300 | 300 | 300 | 300 |
| 9. zinc stearate (parts) | 120 | 120 | 120 | 120 | 120 |

The compositions described in Table 1 are non-tacky granular molding compositions which retain their granular free-flowing form under ordinary storage conditions despite the fact that the binder in these compositions contains from about 22.5 to about 31.5 per cent of an unsaturated liquid monomer (diallyl phthalate). However, if the polymer (polymethylmethacrylate) is omitted from such compositions the materials cannot even be granulated. Not only do the compositions described in Table 1 have the granular form which is highly desirable in alkyd molding compositions, but the fact that they also contain a high proportion of liquid monomer, which is recognized as greatly improving the water resistance and electrical properties of alkyd molding compositions, makes such compositions even more desirable.

The compositions described in Table 1 are molded for one minute under one to four tons of pressure per square inch of projected area in a mold heated with steam at 75 pounds gauge pressure to produce articles which are tested by the following procedures:

Water resistance varies with the amount of moisture that an article is capable of absorbing because the degree of deterioration upon exposure to moisture varies with the amount of moisture absorbed. Molded disks (2 inches in diameter) are immersed in water, and the water absorption is measured as gain in weight (in grams) during immersion. In Table 2 below, the water absorption is given for tests in which test pieces made from compositions of the invention, A through E (columns 2 through 6), are immersed in boiling water for one hour (line 1), or in cold water for 24 hours (line 2) or 48 hours (line 3) or 7 days (line 4).

The Barcol hardness of a disk molded from each composition is determined both before (line 5) and after (line 6) the disk is immersed in boiling water for one hour. Standard "Barcol" hardness apparatus is employed in this test, and hardness is read from a dial gauge which gives hardness readings as compared to an arbitrary standard.

The electrical properties of disks (1/8 inch thick and 4 inches in diameter) molded from compositions A through E are also shown in Table 2 below (lines 7, 8, 9, 10 and 11).

Insulation resistance is one of the most important qualifications of a synthetic resin for use in electrical applications. Insulation resistance may be defined as the resistance offered to the flow of a current when a voltage is impressed between two electrodes embedded in a hardened composition at a standard distance (i. e., 1¼ inches between the center of the electrodes in the standard test used to measure the insulation resistance of articles molded from compositions of the invention). Ordinarily, polymerized alkyd compositions containing a filler are particularly subject to deterioration in insulation resistance when exposed to high relative humidities and high temperatures. However, unsaturated alkyd molding compositions embodying the invention, which comprise a polymer and a relatively high proportion of an unsaturated liquid monomer, are greatly improved in the retention of their insulation resistance.

In an accelerated test used to determine the retention of insulation resistance by compositions of the invention, the polymerized compositions are exposed to high relative humidities and high temperatures for prolonged periods of time to promote the breakdown of their insulation resistance. The insulation resistance is determined by measuring the resistance (in megohms) offered to the flow of a current when a voltage is impressed between two electrodes so embedded in a molded article that there is a distance of 1¼ inches between the centers of the electrodes. Molded articles of compositions A through E are exposed to high temperatures and high relative humidities for given periods of time, and the insulation resistance is tested after exposure of the samples to such conditions. (The initial insulation resistance of each sample is over one million megohms). The results of the insulation resistance tests after exposure to a temperature of 160 degrees F. and a relative humidity of 95 per cent for various lengths of time are given in Table 2 below.

Table 2 also includes the results of strength tests on bars (½" x ¼" x 6") molded from some of the compositions. The strength tests employed are standard tests for plastic materials and are considered to be capable of showing generally the strength characteristics that are important in industrial plastic materials. The flexural and compressive strengths (lines 13 and 14) and the flexural moduli (line 15) of the molded articles are shown in Table 2.

The plasticity test results (line 16) in Table 2 refer in part to the number of pounds ram pressure required to cause the plastic to flow in a standard mold mounted in a standard press, and in part to the flash thickness obtained when flow takes place. Thus, 60#—005" indicates that 60 lbs. pressure is required to mold a cup, and that a flash thickness of 0.005 inch is observed.

The minimum cure (line 17) is the time in seconds required to obtain a fully formed cup which does not show blisters or other evidence of undercure.

Table 2

| | Composition | | | | |
|---|---|---|---|---|---|
| | A | B | C | D | E |
| 1. Boiling water abs. 1 hr | .025 | .025 | .020 | .020 | .020 |
| 2. Cold water abs. 24 hrs | .010 | .010 | .010 | .010 | .005 |
| 3. Cold water abs. 48 hrs | .015 | .015 | .015 | .015 | .010 |
| 4. Cold water abs. 7 days | .035 | .035 | .030 | .035 | .025 |
| 5. Barcol hardness (original) | 66 | 66 | 61 | 63 | 59 |
| 6. Barcol hardness (after boiling) | 59 | 58 | 59 | 58 | 56 |
| 7. Dielectric constant (60 cycles) | 5.96 | 5.89 | 5.74 | 5.85 | 5.4 |
| 8. Power factor (60 cycles) | 0.05 | .052 | .052 | .051 | .045 |
| 9. Dielectric constant (10⁶ cycles) | 4.85 | 4.91 | 4.81 | 4.84 | 4.06 |
| 10. Power factor (10⁶ cycles) | 0.02 | .0202 | .0193 | .019 | .020 |
| 11. Arc resistance (sec.) | 184 | 185 | 187 | 186 | 174 |
| 12. Insulation resistance (meg.): | | | | | |
| 7 days | 520 | 4,000 | 13,000 | 5,000 | 2,500 |
| 14 days | 200 | 800 | 1,900 | 2,500 | 1,000 |
| 13. Flexural, p. s. i | | | 12,200 | 12,200 | |
| 14. Compressive, p. s. i | | | 26,500 | 28,100 | |
| 15. $\dfrac{\text{Flexural Modulus}}{10^6}$ | | | 2.39 | 2.64 | |
| 16. Plasticity | 60#—005" 5" | 40#—011" 5" | 80#—005" 5" | 80#—004" 5" | 60#—005" 5" |
| 17. Minimum cure (sec.) | | | | | |

EXAMPLE 2

(a) A polymerizable unsaturated alkyd (956 grams, prepared by esterifying 1 mol of propylene glycol with 0.2 mol of phthalic anhydride and 0.8 mol of maleic anhydride in the presence of an amount of hydroquinone equal to 0.06 per cent of the charge) and a solution consisting of a polymer (129 grams of polystyrene) dissolved in an unsaturated liquid monomer (386 grams of styrene) are mixed in a Banbury mixer with a catalyst (29.4 grams of t-butyl perbenzoate), kaolin (2000 grams), anthophyllite (1000 grams), zinc oxide (500 grams) and zinc stearate (100 grams). The mixing is continued until a homogeneous dough is obtained. The material is then sheeted and granulated as described in Example 1. (b) A polymerizable unsaturated alkyd (a mixture of 49 parts of the alkyd described in Example 1 and 51 parts of the alkyd described in (a) above) and a solution consisting of a polymer (7.7 parts of polystyrene) dissolved in an unsaturated liquid monomer (23.1 parts of styrene and 23 parts of diallyl phthalate) are mixed in a Banbury mixer with a catalyst of "Luperco ATC" catalyst), resin-coated kaolin particles (195 parts prepared as described in Example 1), resin-coated anthophyllite fibers (130 parts), zinc oxide (25 parts) and zinc stearate (10 parts). (The resin-coated anthophyllite fibers are prepared as follows: A reaction mixture of a heterocyclic polyamine (109 grams of melamine), formalin (210 grams) and water (400 grams) is heated to a temperature of 80 degrees C. As soon as a clear solution is obtained, the pH is adjusted to 6.7 by adding lactic acid (0.7 cc. of a 10 per cent solution), and the heating is continued for a total time of ten minutes. The resin solution is then cooled to 60 degrees C. and diluted with water (3200). The resulting dilute solution is then absorbed on silicate fibers (2093 grams of anthophyllite fibers) in a Hobart mixer, and the resulting treated fibers are then dried on trays at 160 degrees F. for approximately 48 hours.) The mixing is continued until a homogeneous dough is obtained. The material is then sheeted and granulated as described in Example 1.

The non-tacky granular molding compositions prepared as described in (a) and (b) above are molded and tested by the procedures described in Example 1, the results being tabulated in Table 3 below:

Table 3

|  | Composition | |
|---|---|---|
|  | (A) | (B) |
| Boiling water abs. 1 hr | .055 | .030 |
| Cold water abs. 24 hrs | .020 | .010 |
| Cold water abs. 48 hrs | .025 | .015 |
| Cold water abs. 7 days | .060 | .035 |
| Barcol (original) | 43 | 56 |
| Barcol (after boiling) | 30 | 48 |
| Arc resistance (sec.) | 184 |  |
| Compressive (p. s. i.) | 19,700 | 15,100 |
| Flexural (p. s. i.) | 7,800 | 8,700 |
| Flexural Modulus $10^6$ | 2.38 | 1.89 |

EXAMPLE 3

A polymerizable unsaturated alkyd (1262 grams of the unsaturated alkyd described in Example 1) and a solution consisting of a polymer (70 grams of polymethyl methacrylate) dissolved in an unsaturated liquid monomer (421 grams of diallyl phthalate) are mixed in a Banbury mixer with a catalyst (67 parts of "Luperco ATC"), kaolin (779 parts), cellulose flock (700 parts), glass flock (750 parts), resin-treated cellulose (700 parts) zinc oxide (250 parts) and zinc stearate (100 parts). (The resin-treated cellulose filler comprises about 33 to 50 per cent of alpha cellulose and about 50 to 67 per cent of urea-formaldehyde reaction product, and is prepared by impregnating the alpha cellulose with a urea-formaldehyde resin solution (obtained by holding a solution of 2 mols of urea in formalin, containing 3 mols of formaldehyde, at a temperature of 30 degrees C. and at a pH of about 7 for six hours), thoroughly drying the impregnated material at about 101 degrees C., and then grinding in a ball mill to produce a homogeneous powder.) The mixing is continued until a homogeneous dough is obtained. The material is then sheeted and granulated as described in Example 1 to obtain a non-tacky, granular molding composition of the invention.

EXAMPLE 4

A polymerizable unsaturated alkyd (1103 grams of the unsaturated alkyd described in Example 1), a solution of a polymer (542 grams of a solution consisting of 42.5% diallyl phthalate polymer, 2.5% diallyl phthalate monomer and 50% acetone) and an unsaturated liquid monomer (504 grams of diallyl phthalate) are mixed in a Banbury mixer with a catalyst (36 grams of "Luperco ATC"), anthophyllite fibers (1200 grams), dehydrated kaolin (1320 grams), resin-coated kaolin particles (1380 grams prepared as described in Example 1), Zinc oxide (300 grams), and zinc stearate (120 grams). The mixing is continued until a homogeneous dough is obtained. The material is then sheeted and granulated as described in Example 1.

Having described the invention, I claim:

1. A solid molding composition comprising, as a binder, a solution of (a) nine parts of an amorphous polymerizable unsaturated alkyd whose molecule contains a plurality of polymerizably reactive $\Delta^{2,3}$-enedioyl groups, (b) between 1.0 and 5.0 parts of a liquid monomeric substance having at least one polymerizably reactive $CH_2=C<$ group per molecule and having a boiling point of at least 80° C., (c) between 0.1 and 5.0 parts of a polymer of a substance having at least one polymerizably reactive $CH_2=C<$ group per molecule, (c) being compatible with the copolymer of (a) and (b), and (d) a filler comprising from 50 to 85 percent of the total composition; said solid composition being in non-tacky, granular form.

2. A solid molding composition as claimed in claim 1 wherein the monomeric substance is an allyl ester.

3. A solid molding composition as claimed in claim 2 wherein the polymer is polymethylmethacrylate.

4. A solid molding composition as claimed in claim 1 wherein the monomeric substance is diallyl phthalate.

5. A solid molding composition as claimed in claim 4 wherein the polymer is polymethylmethacrylate.

6. A solid molding composition as claimed in claim 1 wherein the polymer is polymethylmethacrylate.

7. A solid molding composition as claimed in claim 1 that comprises 2 to 20 per cent of a base of a metal of group II of the periodic system.

8. A solid molding composition as claimed in claim 1 wherein the polymer is polydiallyl phthalate.

References Cited in the file of this patent

UNITED STATES PATENTS

| 2,464,568 | Flynn et al. | Mar. 15, 1949 |
| 2,498,621 | Kropa et al. | Feb. 21, 1950 |
| 2,528,235 | Loritsch | Oct. 31, 1950 |
| 2,567,719 | Loritsch | Sept. 11, 1951 |
| 2,591,884 | Simon et al. | Apr. 8, 1952 |
| 2,609,353 | Rubens et al. | Sept. 2, 1952 |
| 2,623,025 | Dearing et al. | Dec. 23, 1952 |

FOREIGN PATENTS

| 124,348 | Australia | June 5, 1947 |